United States Patent
Madappa (10) Patent No.: US 11,652,690 B2
(45) Date of Patent: May 16, 2023

(54) ABORTING NETWORK DEVICE UPGRADES

(71) Applicant: Hewlett Packard Enterprise Development LP, Houston, TX (US)

(72) Inventor: Savitha Ponjanda Madappa, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 774 days.

(21) Appl. No.: 16/526,513

(22) Filed: Jul. 30, 2019

(65) Prior Publication Data

US 2021/0036912 A1 Feb. 4, 2021

(51) Int. Cl.
*H04L 41/082* (2022.01)
*H04L 41/0859* (2022.01)
*H04L 41/08* (2022.01)

(52) U.S. Cl.
CPC ........ *H04L 41/082* (2013.01); *H04L 41/0863* (2013.01); *H04L 41/0879* (2013.01)

(58) Field of Classification Search
None
See application file for complete search history.

(56) References Cited

U.S. PATENT DOCUMENTS

| | | |
|---|---|---|
| 6,113,652 A | 9/2000 | Lysik et al. |
| 6,167,567 A | 12/2000 | Chiles et al. |
| 9,239,718 B2 | 1/2016 | Grinberg et al. |
| 2012/0291021 A1* | 11/2012 | Banerjee ............ G06F 9/45558 717/173 |
| 2014/0173581 A1* | 6/2014 | Grinberg ................. G06F 8/654 717/172 |
| 2014/0344800 A1* | 11/2014 | Ohs ......................... G06F 8/654 717/171 |
| 2015/0373561 A1 | 12/2015 | Huang et al. |
| 2016/0266894 A1 | 9/2016 | Panicker et al. |

FOREIGN PATENT DOCUMENTS

CN 106598682 4/2017

OTHER PUBLICATIONS

Managing Firmware Upgrades, (Web Page), Retrieved Feb. 24, 2019, 2 Pgs.

* cited by examiner

*Primary Examiner* — Jeffrey R Swearingen
(74) *Attorney, Agent, or Firm* — Hewlett Packard Enterprise Patent Department (57) ABSTRACT

Examples of the present disclosure relate to updating network devices belonging to a group of network devices. In one aspect, a network controller coupled to the network devices of the group of network access devices, responsive to a first command, initiates a group update process for the network devices of the group is to update the network devices of the group sequentially according to an ordered list. Responsive to a second command during the group update process while a firmware image of a particular network device is updated, the network controller aborts the group update process for the network devices of the group. Aborting the group update process comprises removing a first subset of network devices subsequent to the particular network device in the ordered list from the ordered list such that the firmware image of the first subset of network devices will not be updated and rolling back the firmware image of the particular network device.

20 Claims, 8 Drawing Sheets

ABORTING NETWORK DEVICE UPGRADES

BACKGROUND

Many network environments contain multiple network devices that permit access to the network and/or form part of the network infrastructure. For example, in an enterprise environment multiple access devices such as access points and gateways may be provided to permit access to the Internet or to an enterprise computing network. The enterprise computing network infrastructure may include multiple network devices such as switches. Network devices of a particular type may be arranged in groups to facilitate efficient configuration and maintenance of the network devices. For example, a plurality of access points that are located on a floor of a building to permit access to the Internet or enterprise network to users located on that floor may be grouped into a single access point group, whilst a plurality of switches of the same type may be grouped into a single switch group. The network devices are coupled to a central controller such as a computer or server which performs configuration and maintenance operations for the coupled network devices under control of a user, typically via a user interface provided by the central controller. When a device upgrade (e.g. a device firmware upgrade) is available for the coupled network devices, the central control device applies the upgrade to the groups of network devices. This upgrade process can involve downtime of groups of network devices, as typically once an upgrade image has been received and installed by a network device, the network device must be rebooted. As will be appreciated, if all of the network devices of a group must reboot simultaneously, availability of the network(s) to which the group of network devices belong will be disrupted. For this reason, upgrades are usually scheduled for times when the disruption caused by such network device downtime will be minimised.

BRIEF DESCRIPTION OF THE DRAWINGS

The following detailed description references the drawings, wherein.

DETAILED DESCRIPTION

One approach to updating or upgrading network devices such as access points belonging to a group is to update the network devices in the group sequentially according to an ordered list. For example, a list of network devices in a group may be ordered numerically according to identification numbers of the network devices, or alphabetically according to device names or other identifiers. Other ways of ordering network devices in a group into a list will be apparent to those skilled in the art.

When an update or upgrade is available, a central controller coupled to all of the network devices of the group initiates a group update process transmits an update image (e.g. a firmware image) to each of the network devices of the group in sequence according to the ordered list. The network devices of the group are thus updated sequentially according to the ordered list.

This approach avoids the problem of downtime associated with the approach discussed above, in which all of the devices of a group are updated at the same time. Downtime is avoided as a user device that is connected to a first network device that is being updated can be temporarily handed off or migrated to another network device in the group in order to maintain service to the user device during the while the first network device is updated.

An issue that can arise with this approach is that if the network device update cannot be completed for some reason (e.g. if the wrong update image has been provided, if the network device is unable to access a URL required to activate the update image, if a DNS failure occurs, if the download of the update image to the network device times out due to low bandwidth, if the network device freezes or enters a stuck state after receiving or activating the update image), the update may be re-tried multiple times for that network device (e.g. the update may be attempted three times) before the group update process moves on to the next network device in the ordered list. This means that the network operator has to wait until the update process has been attempted (perhaps multiple times) for all of the network devices in a group before any remedial action can be taken to rectify faults that may have occurred in the update process. For large groups of network devices this delay may be significant (several hours, perhaps).

Accordingly, one example of the present disclosure is directed to a network controller to couple to a plurality of network devices belonging to a group, the network controller to control a group update process for the plurality of network devices of the group. The network controller comprises a processing resource and a storage medium storing instructions. The instructions are executable by the processing resource to cause the network controller to initiate the group update process to update the network access devices of the group sequentially according to an ordered list and, responsive to receiving a command to abort the group update process during the group update process while a firmware image of a particular one of the plurality of network devices is updated, abort the group update process. Aborting the group update process comprises removing a first subset of network devices subsequent to the particular one of the plurality of network devices in the ordered list from the ordered list such that the firmware image of the first subset of network devices will not be updated and rolling back the firmware image of the particular network access device.

A further example of the present disclosure is directed to a method for updating network devices belonging to a group of network devices. The method comprises, at a network controller coupled to the network devices of the group of network access devices, responsive to a first user command, initiating a group update process for the network devices of the group to update the network devices of the group sequentially according to an ordered list and, responsive to a second user command during the group update process while a firmware image of a particular network device is updated, aborting the group update process for the network devices of the group. Aborting the group update process comprises removing a first subset of network devices subsequent to the particular network device in the ordered list from the ordered list such that the firmware image of the first subset of network devices will not be updated; and rolling back the firmware image of the particular network device.

A further example of the present disclosure is directed to a non-transitory machine-readable storage medium comprising instructions. When executed by a processing resource the instructions cause a computing device to initiate a group update process for a plurality of network access devices belonging to a group to update the network access devices of the group sequentially according to an ordered list and, responsive to receiving a command to abort the group update process during the group update process while a firmware image of a particular network access device is updated, abort the group update process. Aborting the group update process comprises removing a first subset of network access devices subsequent to the particular network access device in the ordered list from the ordered list such that the firmware image of the first subset of network access devices will not be updated and rolling back the firmware image of the particular network access device.

Figure 1:
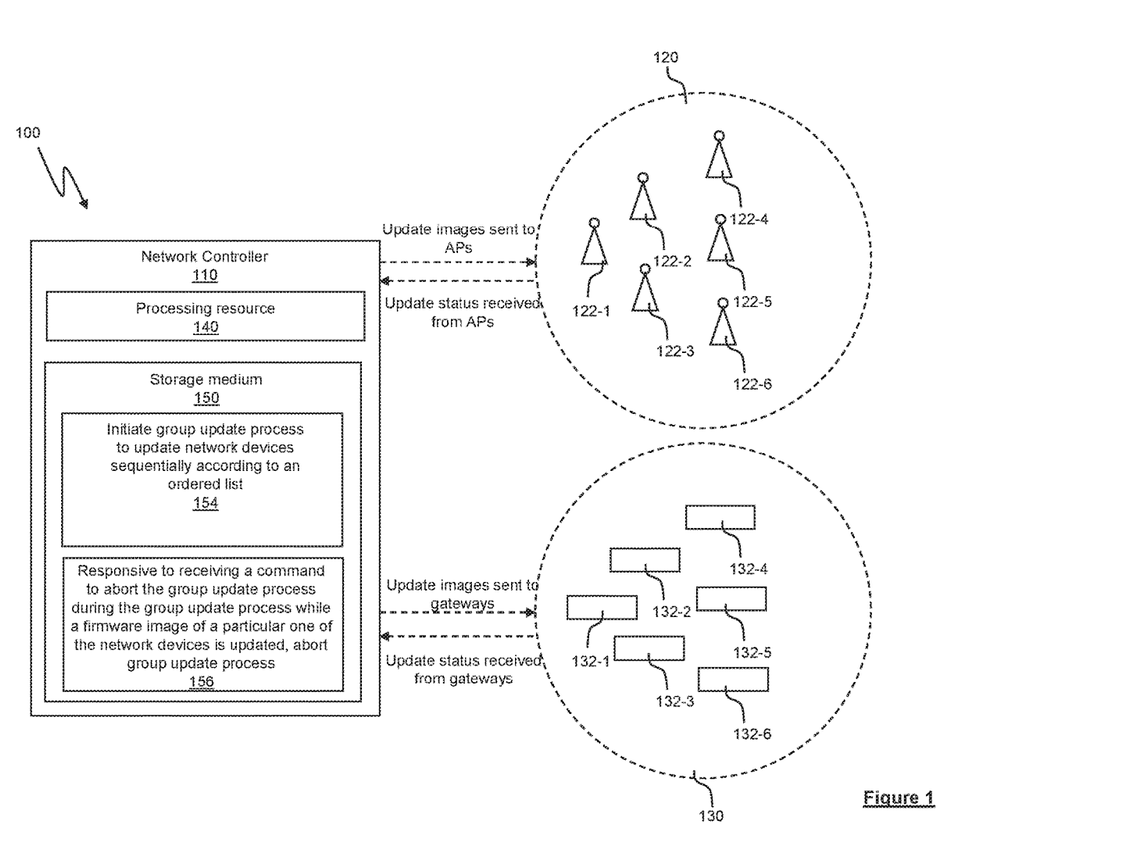
FIG. 1 is a schematic representation of a network environment.

FIG. 1 is a schematic illustration of a network environment. The network environment, shown generally at 100, includes a network controller 110 coupled to a first group 120 of network devices which, in this example, are access points 122-1-122-6, and to a second group 130 of network devices which, in this example, are gateways 132-1-132-6. It is to be understood that although the example network environment 100 of FIG. 1 includes a group of access points and a group of gateways, the principles of the of the present disclosure are applicable to groups of network devices of different types, for example, switches and software defined networking devices (also referred to as SD-WAN devices) such as virtual controllers.

The network controller 110 includes a processing resource 140 and a storage medium 150 such as random access memory (RAM), read-only memory (ROM), a hard disc drive, a solid-state drive or any other suitable storage medium. The storage medium 150 stores instructions which, when executed by the processing resource 140, cause the network controller to initiate 154 a group update process to update the network devices of a group 120, 130 sequentially according to an ordered list, and to abort 156 the group update process responsive to receiving a command to abort the group update process during the group update process while a firmware image of a particular one of the network devices is being updated.

The group update process may be initiated in response to a command issued by a user, or in response to a command issued as a result of a predetermined condition being satisfied, as will be described in further detail below. Similarly, the group update process may be aborted in response to a command issued by a user, or in response to a command issued as a result of detection by the network of a predetermined network state or change in the network, as will be described in further detail below.

Figure 2:
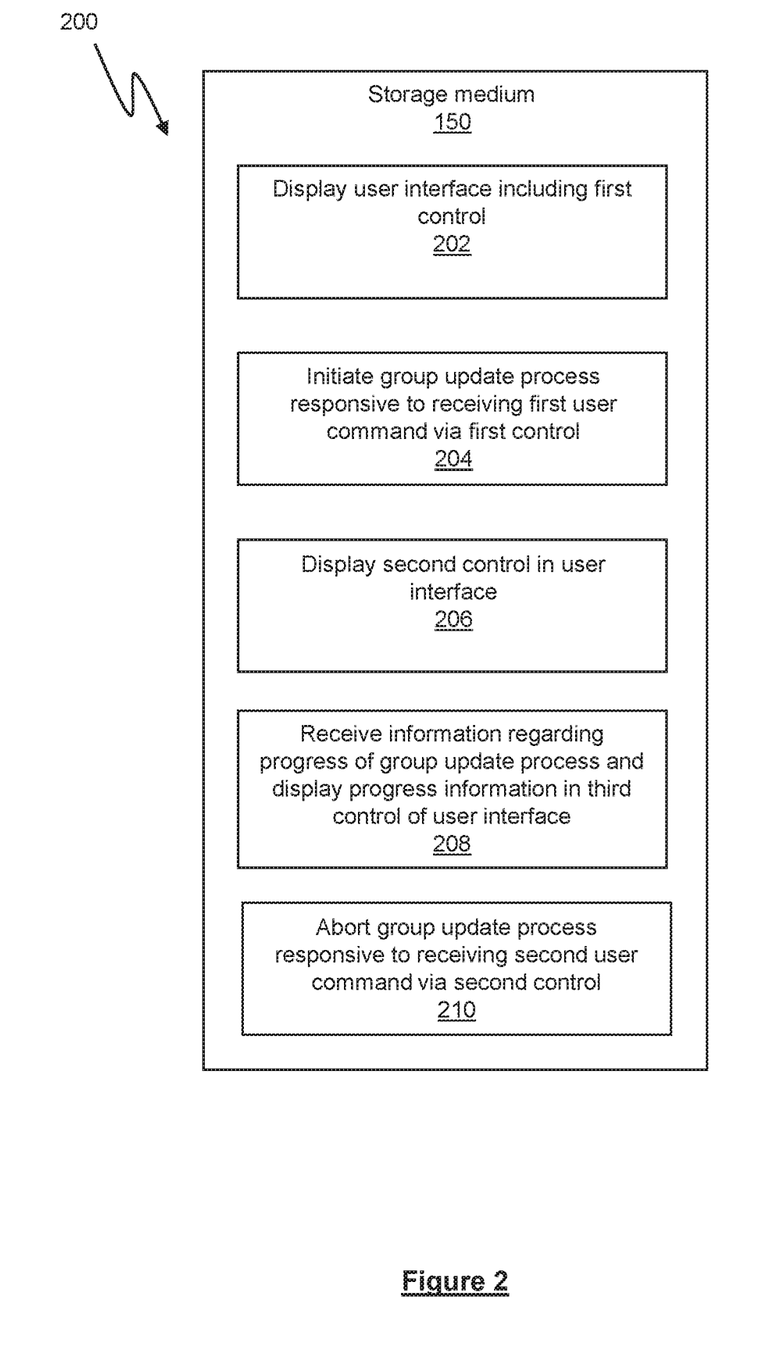
FIG. 2 is a schematic diagram illustrating a storage medium storing instructions for initiating and aborting a group update process for a group of network devices.

FIG. 2 is a schematic illustration showing instructions 200 stored in the storage medium 150 to initiate and abort the group update process responsive to commands received from a user of the network controller 110 via a user interface of the network controller 110.

The instructions 200 include an instruction 202 to cause the network controller 110 to display a user interface including a first control that can be actuated by a user of the network controller to initiate the group update process. The first control may be, for example, a first virtual button displayed on the user interface.

The instructions 200 further include an instruction 204 to cause the network controller 110 to initiate the group update process responsive to receiving a first user command corresponding to an initiate command received from the user via the first control. For example, the group update process may be initiated responsive to receiving a user input such as a mouse click, touch or other suitable user input on the first control displayed on the user interface.

The instructions 200 further include an instruction 206 to cause the network controller 110 to display on the user interface a second control that can be actuated by a user of the network controller 110 to abort the group update process. The second control may be, for example, a second virtual button displayed on the user interface.

The instructions 200 further include an instruction 208 to cause the network controller 110 to receive, from the network devices of the group of network devices, information regarding the progress of the group update process and to display progress information in a third control of the user interface. For example, the network controller 110 may receive from each network device of the group of network devices status information indicating if that device is waiting to be updated, has been updated or is in the process of being updated, and, if so, the progress (e.g. percentage completed) of the update process. The status information received from the network devices may be presented in the third control of the user interface, for example as a list showing network device identifiers (e.g. network device names or numbers) against the status information for that network device.

The instructions 200 further include an instruction 210 to abort the group update process responsive to receiving a second user command via the second control of the user interface. For example, the group update process may be aborted responsive to receiving a user input such as a mouse click, touch or other suitable user input on the second control displayed on the user interface.

Figure 3:
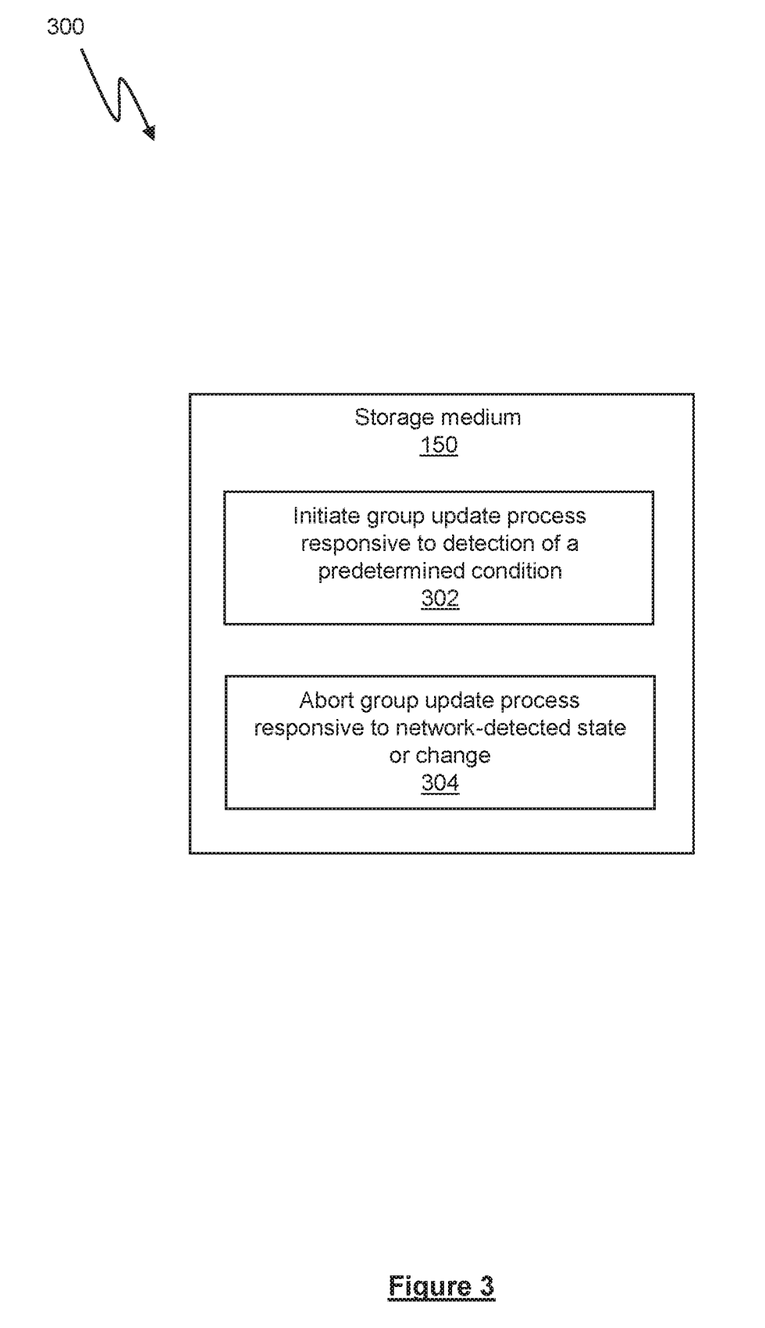
FIG. 3 is a schematic diagram illustrating a storage medium storing instructions for initiating and aborting a group update process for a group of network devices.

FIG. 3 is a schematic illustration showing instructions 300 stored in the storage medium 150 to initiate and abort the group update process responsive to commands issued on detection of predetermined conditions.

The instructions 300 include an instruction 302 to initiate the group update process responsive to detection of a predetermined condition which may be, for example, detection by or notification to the network controller that a firmware update image for the network devices of the group of network devices is available, or detection that a predetermined or pre-set update time (e.g. a date and time) or the beginning of a predetermined or pre-set update time window (e.g. a date and time), has been reached.

The instructions 300 further include an instruction 304 to abort the group update process responsive to detection of a predetermined condition which may be, for example, a state or change detected by the network. For example, if the network detects that a network device being updated has entered a frozen state, the instruction 304 to abort the group update process may be executed.

As will be apparent from the discussion above, the group update process may be initiated and aborted responsive to user commands received, for example, via appropriate controls of a user interface of the network controller 110, or responsive to detection of predetermined condition. Additionally, the group update process may be initiated responsive to a user command and, once initiated, aborted responsive to detection of a predetermined condition. Similarly, the group update process may be initiated responsive to detection of a predetermined condition, and, once initiated, may be aborted responsive to a user command. In other words, it is to be understood that the instructions illustrated in FIGS. 2 and 3 are not mutually exclusive.

Figure 4:
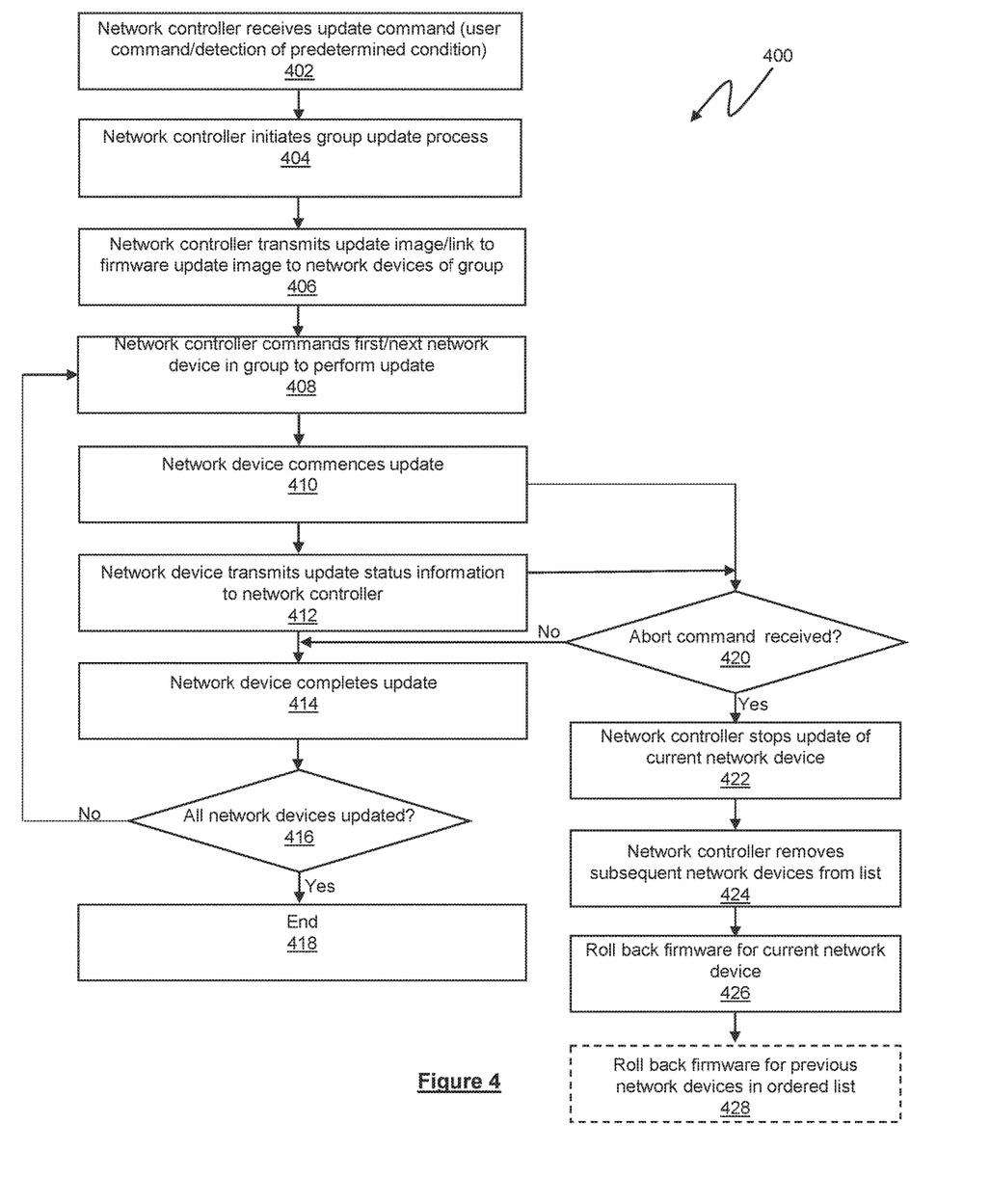
FIG. 4 is a flow diagram illustrating a group update process.

FIG. 4 is a flow diagram illustrating a group update process 400 that is initiated by a network controller such as network controller 110 to update network devices of a group of network devices such as groups 120, 130 of network devices 120-2-120-6, 130-2-130-6.

At step 402 the network controller receives a command to initiate the group update process. As discussed above, the command to initiate the group update process may arise as a result of a user command such as a user input to a first control of a user interface displayed by the network controller, or may arise as a result of detection of a predetermined condition such as detection by or notification to the network controller that a firmware update image for the network devices of the group of network devices is available, or detection that a predetermined or pre-set update time (e.g. a date and time) or the beginning of a predetermined or pre-set update time window (e.g. a date and time), has been reached.

At step 404 the network controller initiates the group update process. Once the group update process has been initiated by the group update process, a second user interface control is displayed on the user interface, and can be actuated by a user to abort the group update process.

At step 406 the network controller transmits a firmware update image to all of the network devices of the group of network devices. Alternatively, the network controller may transmit to the network devices of the group of network devices a link to a location from which a firmware update image can be downloaded by the network devices of the group.

At step 408 the network controller issues a command to a first network device in the group of network devices, according to an ordered list of all of the network devices in the group, instructing the first network device to perform the update.

At step 410 the network device commences the update. The network device may need to re-start the update if it cannot be completed for any reason. During the update process the network device transmits information as to the status of the update, e.g. information as to whether the update has started, percentage completion information, number of retries and the like, to the network controller as the update progresses (step 412). The network controller may display status information based on the information received from the network device in the user interface, e.g. in a third control of the user interface.

At step 414 the network device completes the update and notifies the network controller that the update has been completed. The network controller performs a check at step 416 to determine whether all of the network devices in the group have been updated. If so, the process ends at step 418. If not, the process returns to step 408, at which the network controller commands the next network device in the group, according to the ordered list of network devices in the group, to perform the update, and steps 410-416 are repeated for that network device.

At any time during the process of updating the network device (i.e. after a network device commences the update at step 410 and before the network device completes the update at step 414), an abort command may be received by the network controller, either as a result of a user input on the second control of the user interface or as a result of a network-detected condition or change, for example, if the network detects that the network device being updated has entered a frozen state.

In response to a determination at step 420 that an abort command has been received, the network controller stops the update of the current network device at step 422, and removes subsequent network devices from the ordered list at step 424, to ensure that the update process does not continue for those subsequent network devices. At step 426 the network controller rolls back the firmware of the current network device to a version that was active on that network device prior to the commencement of the update process. This ensures that the network device is able to return to a functional state. The network controller may also, at step 428, roll back the firmware of previous network devices in the ordered list (i.e. those network devices that have already been updated) such that all of the network devices of the group are operating with the same firmware version, to ensure compatibility between the network devices and to facilitate a subsequent group update process for the network devices of the group.

Figure 5:
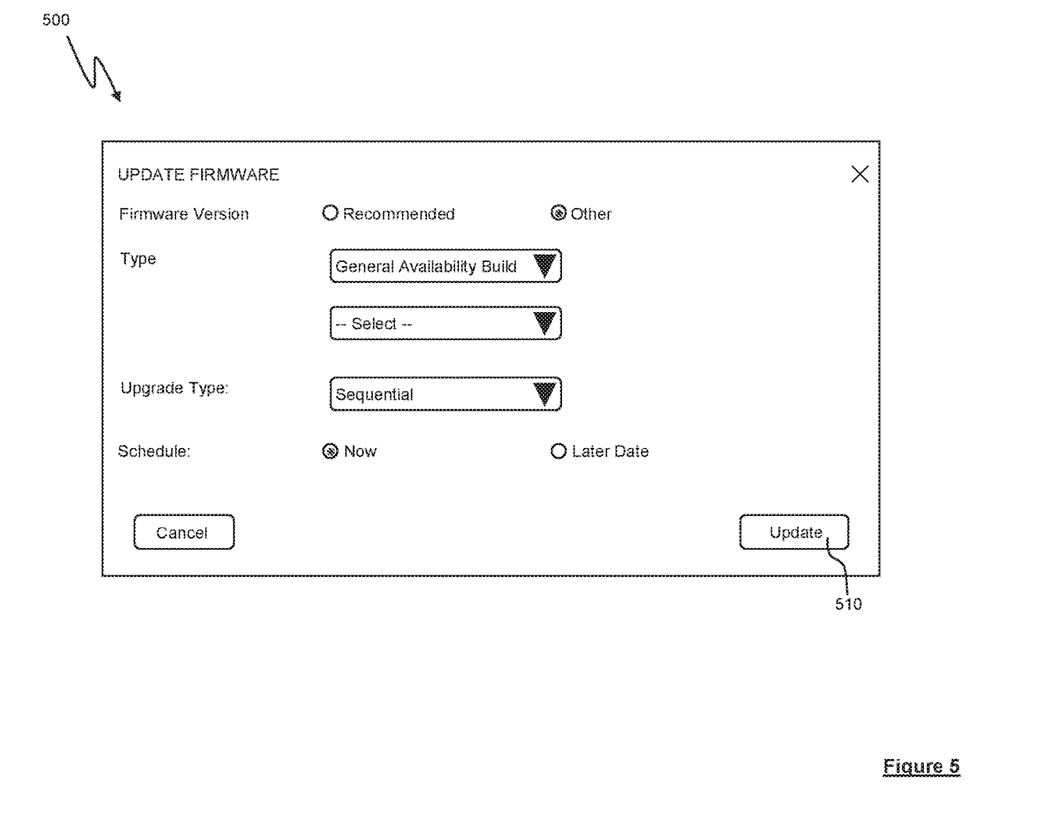
FIGS. 5-7 are schematic representations of user interface screens that may be displayed by a network controller to facilitate user control of a group update process.
Figure 6:
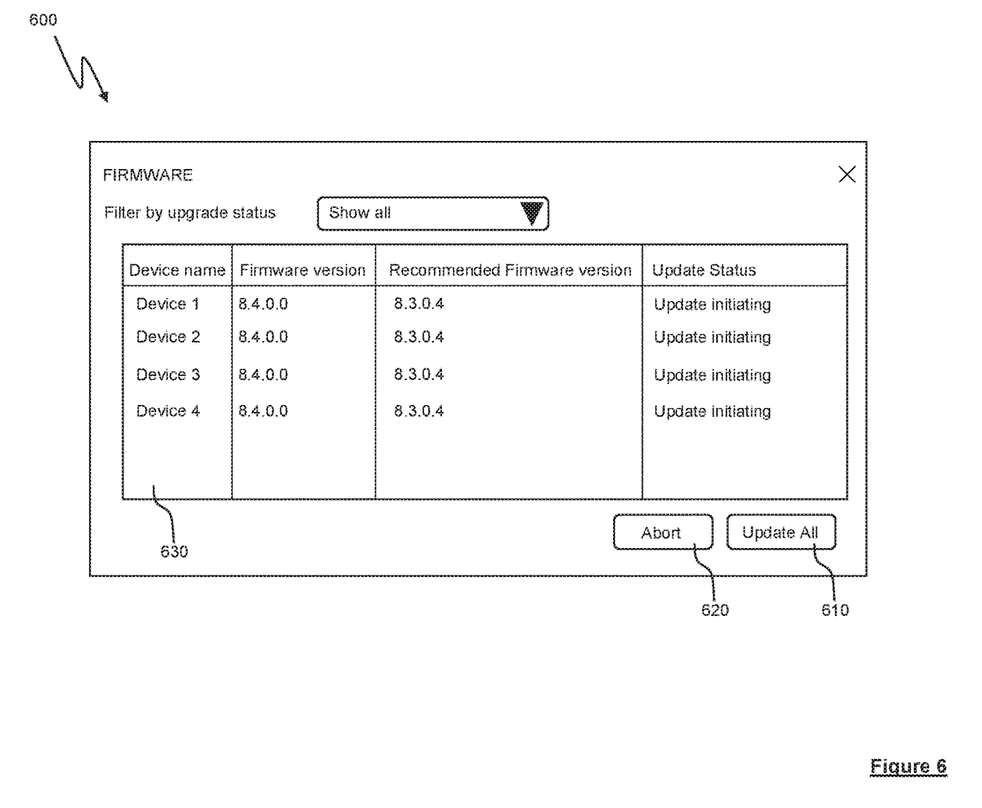
Figure 7:
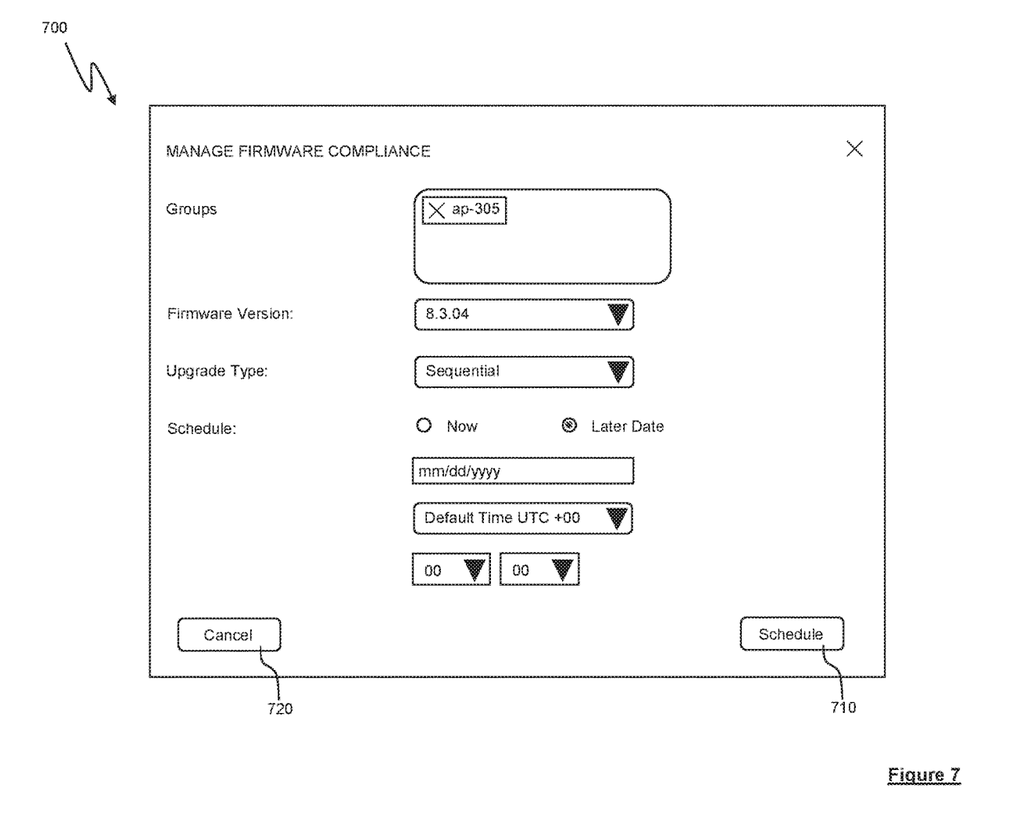

FIGS. 5-7 are schematic representations of user interface screens that may be displayed by a network controller such as network controller 110 to facilitate user control of a group update process.

FIG. 5 shows a first screen 500 of a user interface for the network controller, which permits a user to set parameters for a group update process. The screen 500 includes user interface elements such as radio buttons and drop-down menus allowing configure parameters of the group update process and to select whether the update process is performed immediately or at a scheduled time. The screen 500 also includes a first user interface control 510, in this example in the form of a button labelled "Update", which can be actuated by the user to issue a command to the network controller to initiate the group update process discussed above for a group of network devices using the parameters set by the user using the user interface elements.

FIG. 6 shows a second screen 600 of the user interface for the network controller, which permits a user to view the progress of a group update process and to abort the group update process if desired. The screen 600 includes a first user interface control 610, in this example in the form of a button labelled "Update All" which can be actuated by the user to issue a command to the network controller to initiate the group update process discussed above for a group of network devices. The first user interface control thus provides an alternative to the first user interface control 510 of the screen 500 for initiating the group update process. The screen 600 also includes a second user interface control 620, in this example in the form of a button labelled "Abort" which can be actuated by the user to issue a command to the network controller to abort the group update process as discussed above. The screen 600 also includes a third user interface control 630 which displays the status or progress of the group update process for each network device of the group of network devices. The information displayed on the third user interface control 630 enables the user to see at a glance the progress of the group update process and to identify any problems or delays that may be occurring in the group update process that may require the group update process to be aborted in order to be resolved.

FIG. 7 shows a third screen 700 of the user interface for the network controller, which permits a user to schedule a group update for a group of network devices. The screen 700 includes user interface elements allowing the user to select one or more groups of network devices to update, a firmware version to be used in the group update process, and to set a date and time at which the group update process should commence. A button 710 labelled "Schedule" can be actuated by the user to confirm the scheduled group update, whilst a button labelled "Cancel" can be actuated by the user to cancel scheduling of a group update.

Figure 8:
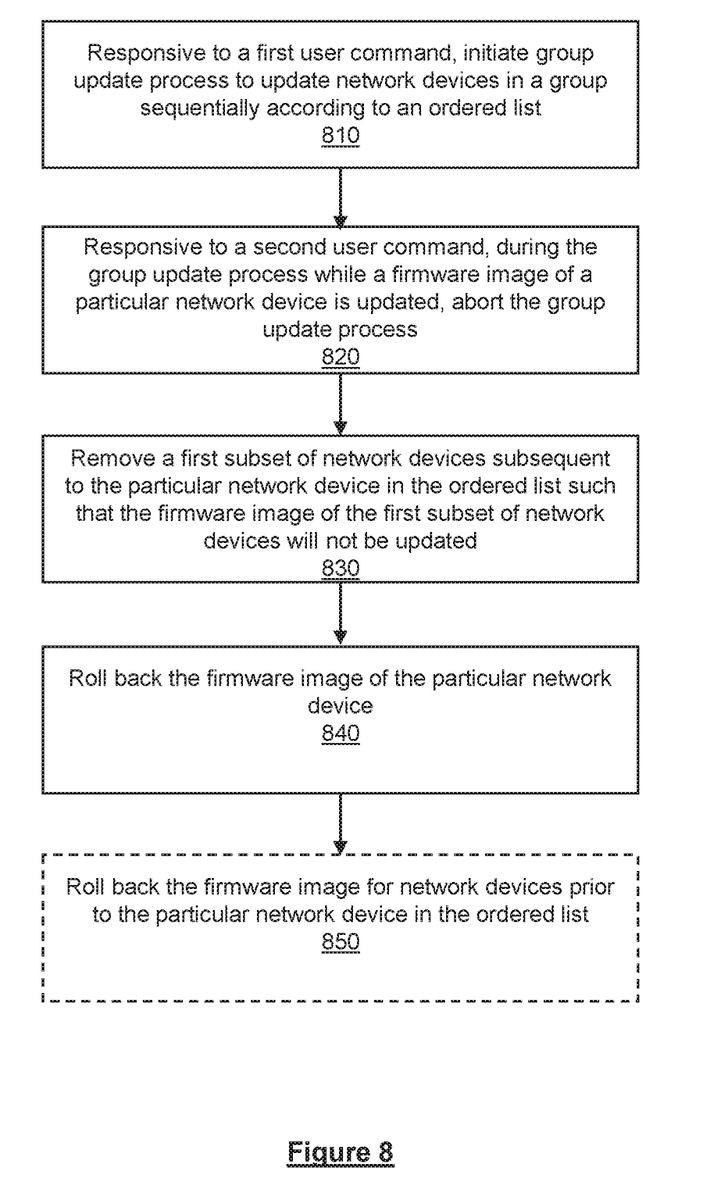
FIG. 8 is a flow diagram illustrating steps in a method performed by a network controller to initiate and abort a group update process responsive to commands received from a user.

FIG. 8 is a flow diagram illustrating steps in a method 800 performed by a network controller such as network controller 810 to initiate and abort a group update process responsive to commands received from a user.

At step 810 the network controller initiates a group update process to update network devices in a group sequentially according to an ordered list, in response to a user command, e.g. a user command issued by the user via the first user interface control 510 or 610 of the user interface screen 500 or 600. The group update process proceeds as described above with reference to FIG. 4.

At step 820, responsive to a second user command received by the network controller during the group update process while a firmware image of a particular network device is being updated (e.g. a command issued by the user via the second user interface control 620 of the screen 600), the network controller aborts the group update process.

To abort the group update process, at step 830 the network controller removes a first subset of network devices that are subsequent in the ordered list to the particular network device that is currently being updated, such that the firmware image of the first subset of network devices will not be updated. Because the group update process ends when all of the network devices in the ordered list have been updated (e.g. steps 416 and 418 of the process of FIG. 4), removing the network devices that appear after the particular network device that is currently being updated in the ordered list has the effect of causing the group update process to end before all of the network devices of the group have been updated, thus prematurely aborting the group update process.

The network controller then, at step 840, rolls back the firmware image of the particular network device that is being updated to a previous version, e.g. the firmware version that was operational on the particular network device immediately prior to the commencement of the group update process. This ensures that the network device is able to return to a functional state.

The network controller may also, at step 850, roll back the firmware image for network devices prior to the particular network device in the ordered list (i.e. those network devices that have already been updated) to a previous version, e.g. the firmware version that was operational on the network devices immediately prior to the commencement of the group update process. This ensures that all of the network devices of the group are operating with the same firmware version, to ensure compatibility between the network devices and to facilitate a subsequent group update process for the network devices of the group.

As will be apparent from the foregoing discussion, the present disclosure provides a mechanism to abort a sequential group update process for a group of network devices such as access points, gateways, switches SD-WAN devices and the like which improves the efficiency of troubleshooting, by obviating the need for a user to wait for the entire sequential group update process to complete before remedial action can be taken to resolve any faults or errors that may have arisen in the group update process. Instead, the group update process can be aborted, either in response to a user command or in response to a predefined network-detected condition, part-way through the group update process to permit remedial action to be taken immediately on detection of an error or fault by the user or by the network. Moreover, in aborting the group update process, the network device that was being updated when the abort command was received, and in some cases the other network devices of the group, are restored to an operational state by rolling back their firmware to a previous version.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality. Any reference signs in the claims shall not be construed so as to limit their scope.

The invention claimed is:

1. A network controller to couple to a plurality of network devices, wherein the plurality of network devices belong to a group, the network controller to control a group update process for the plurality of network devices of the group, the network controller comprising:
    a processing resource;
    a storage medium storing instructions executable by the processing resource to cause the network controller to:
    initiate the group update process to update the network devices of the group sequentially according to an ordered list; and
    responsive to receiving a command to abort the group update process during the group update process after a firmware image of a particular one of the plurality of network devices commences the update and before the particular network device completes the update, abort the group update process, wherein aborting the group update process comprises:
        removing a first subset of network devices subsequent to the particular network device in the ordered list from the ordered list such that the firmware image of the first subset of network devices will not be updated; and
        rolling back the firmware image of the particular network device.

2. A network controller according to claim 1 wherein the instructions are further to cause the network controller to display a user interface comprising a first control, and wherein the instructions are to cause the network controller to initiate the group update process responsive to receiving a first user command via a first control of the user interface.

3. A network controller according to claim 2 wherein the user interface comprises a second control, and wherein the command to abort the group update process is responsive to receiving a second user command via the second control of the user interface.

4. A network controller according to claim 2 wherein the instructions are to cause the network controller to receive, from each network device of the group of network devices, information regarding progress of the update of that network device, and wherein the user interface comprises a third control to display progress information of the group update process.

5. A network controller according to claim 1 wherein the instructions are to cause the network controller to initiate the group update process responsive to detection of a predetermined condition.

6. A network controller according to claim 5 wherein the predetermined condition comprises one or more of:
    availability of a firmware update image;
    a scheduled time.

7. A network controller according to claim 1 wherein the command to abort the group update process is responsive to a network-detected state or change.

8. A network controller according to claim 1 wherein the group update process comprises:
- transmitting a firmware update image to each network device of the group; or
- transmitting a link to a location of a firmware update image to each network device of the group.

9. A network controller according to claim 1 wherein the network devices comprise:
- access points;
- gateways;
- switches; or
- SD-WAN devices.

10. A method for updating network devices belonging to a group of network devices, the method comprising:
- at a network controller coupled to the network devices of the group of network access devices:
  - responsive to a first user command, initiating a group update process for the network devices of the group, wherein the group update process is to update the network devices of the group sequentially according to an ordered list; and
  - responsive to a second user command during the group update process after a firmware image of a particular network device commences the update and before the particular network device completes the update, aborting the group update process for the network devices of the group, wherein aborting the group update process comprises:
    - removing a first subset of network devices subsequent to the particular network device in the ordered list from the ordered list such that the firmware image of the first subset of network devices will not be updated; and
    - rolling back the firmware image of the particular network device.

11. A method according to claim 10 wherein the group update process comprises:
- transmitting a firmware update image to each network device of the group; or
- transmitting a link to a location of a firmware update image to each network device of the group.

12. A method according to claim 10 further comprising:
- receiving, from a network device of the group of network devices, information regarding progress of the update of that network device; and
- displaying progress information of the group update process.

13. A method according to claim 10 wherein the first and second user commands are received via respective first and second controls of a user interface.

14. A method according to claim 10 wherein the network devices comprise:
- access points;
- gateways;
- switches; or
- SD-WAN devices.

15. A non-transitory machine-readable storage medium comprising instructions that when executed by a processing resource cause a computing device to:
- initiate a group update process for a plurality of network access devices belonging to a group, wherein the group update process is to update the network access devices of the group sequentially according to an ordered list; and
- responsive to receiving a command to abort the group update process during the group update process after a firmware image of a particular network access device commences the update and before the particular network device completes the update, abort the group update process, wherein aborting the group update process comprises:
  - removing a first subset of network access devices subsequent to the particular network access device in the ordered list from the ordered list such that the firmware image of the first subset of network access devices will not be updated; and
  - rolling back the firmware image of the particular network access device.

16. A non-transitory machine-readable storage medium according to claim 15 wherein the instructions, when executed by the processing resource, further cause the processing resource to initiate the group update process automatically responsive to detection of a predetermined condition.

17. A non-transitory machine-readable storage medium according to claim 16 wherein the predetermined condition comprises one or more of:
- availability of a firmware update image;
- a scheduled time; or
- a user command to initiate the group update process.

18. A non-transitory machine-readable storage medium according to claim 15 wherein the command to abort the group update process is responsive to a user command.

19. A non-transitory machine-readable storage medium according to claim 15 wherein the command to abort the group update process is responsive to a user command.

20. A non-transitory machine-readable storage medium according to claim 15 wherein the network access devices comprise:
- access points;
- gateways;
- switches; or
- SD-WAN devices.

* * * * *